Nov. 19, 1968  R. T. FIELDS  3,411,215
APPARATUS AND PROCESS FOR DRYING PARTICULATE POLYMER
Filed Dec. 8, 1966  3 Sheets-Sheet 1

INVENTOR
REUBEN T. FIELDS
BY
ATTORNEY

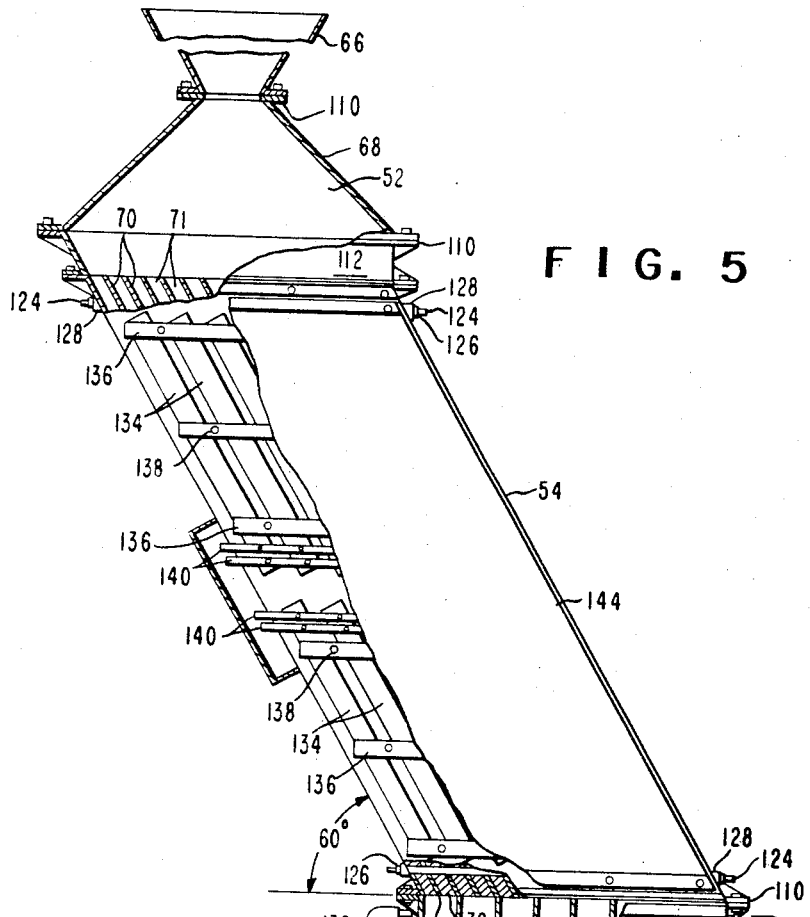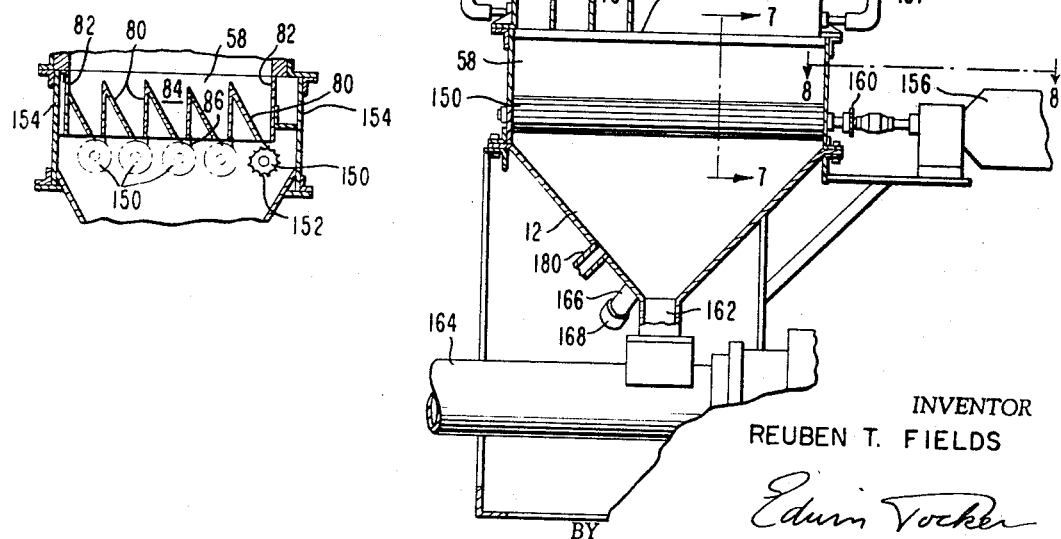

Nov. 19, 1968  R. T. FIELDS  3,411,215
APPARATUS AND PROCESS FOR DRYING PARTICULATE POLYMER
Filed Dec. 8, 1966  3 Sheets-Sheet 3

INVENTOR
REUBEN T. FIELDS

BY  *Edwin Tocker*

ATTORNEY

United States Patent Office 3,411,215
Patented Nov. 19, 1968

3,411,215
APPARATUS AND PROCESS FOR DRYING
PARTICULATE POLYMER
Reuben T. Fields, Wilmington, Del., assignor to E. I. du Pont de Nemours and Company, Wilmington, Del., a corporation of Delaware
Filed Dec. 8, 1966, Ser. No. 600,235
14 Claims. (Cl. 34—12)

ABSTRACT OF THE DISCLOSURE

Polymer powder is dried by an apparatus and process wherein the polymer is gravity flowed along an inclined path which is filled with the polymer, with the path being shallow in one width direction and with heat being applied to the polymer powder by the wall defining the shallow direction of the path. Dried polymer is obtained from the exit end of the path wherein inert gas is added to the path to maintain the polymer under an inert atmosphere during the application of heat.

---

This invention relates to dryers and more particularly to apparatus and process for drying polymer in particulate free-flowing form.

The presence of small amounts of moisture, e.g., greater than about 0.2 percent by weight of moisture, in polymer in powder form can adversely affect the quality of articles which are melt fabricated therefrom such as by extrusion or injection molding. In the case of polyamide (nylon) powder, the moisture can have two effects; namely, to react with the polyamide at the temperatures attained in melt fabrication equipment to cause a lowering of the molecular weight and thereby the strength of the polyamide, and the moisture may form steam during the polyamide melt, which causes the formation of bubbles in the molded article and possibly extrusion die markings on the exterior surface thereof.

Polymer powder, particularly polyamide powder, has previously been dried by heating with an inert gas in an oxygen-free environment. This method, however, involves the use of relatively large amounts of inert gas which, for economical purposes, requires that the inert gas be dehumidified and recycled. In another method, heated air has been used as the drying gas. However, because the polymer, especially when it is polyamide, tends to oxidize in the presence of air at elevated temperatures, the drying temperature has been kept fairly low which limits the speed at which drying may occur and the capacity of the drying apparatus.

An apparatus and process have now been discovered which can dry polymer in particulate free-flowing form on an economical basis without the need for dehumidification or recycling of drying gas and which is done rapidly in equipment of relatively low cost.

The process of the present invention can be described as advancing the particulate polymer by gravity-flow along at least one laterally enclosed path which is shallow in one cross-sectional direction, maintaining the path filled with this polymer, applying heat to the lateral enclosure which defines the shallow direction of the cross-section of the path so as to heat the polymer in the path by heat transfer from the lateral enclosure, maintaining the polymer in the path under an inert atmosphere during this heat application, and obtaining as a result thereof essentially dry particulate polymer.

The process of the present invention can be conducted in a structure defining a single laterally enclosed path having the cross-section hereinbefore described and suitably inclined to give gravity flow. However, higher capacities are obtained when more than one such path is used, each of which has an inlet end and an outlet end, with all the inlet ends being fed with particulate polymer from a common source and with the dried polymer from all the outlet ends being combined in a common receiver.

These and other aspects of the present invention will be discussed more fully hereinafter with reference to the drawings in which:

FIG. 5 is a side elevation generally of the apparatus of FIG. 4;

FIG. 7 is a section taken along line 7—7 of FIG. 5;

Figure 1:
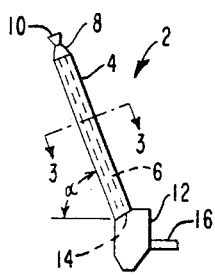
FIG. 1 is a schematic side elevation of drying apparatus incorporating features of the present invention.

Referring now to the drawings, in FIG. 1 is shown a dryer apparatus 2 comprising an elongated structure 4 which defines a laterally enclosed path 6 therethrough, a structure 8 which tapers inwardly from the top of the elongated structure 4 to hopper 10 which is open at the bottom to form a constricted inlet for feeding moist polymer in particulate free-flowing form to the path 6, an enclosed container 12 for receiving dry polymer from the outlet 14 of path 6, and an inlet 16 for feeding an inert gas into the apparatus 2 for maintaining the polymer therein under an inert atmosphere.

The elongated structure 4 is inclined from the horizontal at an angle α at which the particulate polymer flows along the path 6 by gravity flow. This angle will fall between the angle of repose of the particulate polymer being dried and the greater angle at which the weight of the polymer under the influence of gravity packs and blocks the path. This greater angle will depend on the flow character of the polymer and dimensions of the path. For some particulate polymer, angle α can be as high as 90°. However, to insure against blockage, the path 6 is generally inclined at an angle α of no greater than 80°.

Figure 2:
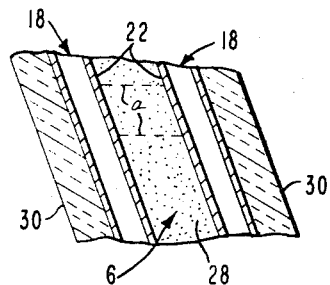
FIG. 2 is a longitudinal section in the plane of the paper of a portion of the apparatus shown in FIG. 1.
Figure 3:
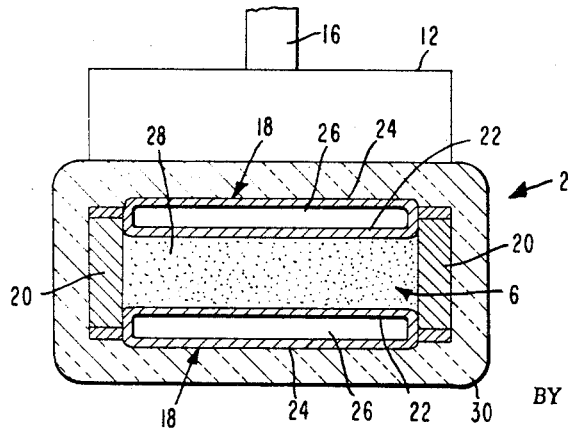
FIG. 3 is a section taken along line 3—3 of FIG. 1.

The elongated structure 4 includes means for heating the polymer by heat transfer across the height of the cross-section of path 6. In this embodiment, the heating means are a pair of heat exchange plates 18, which together with a pair of spaced end bars 20, form the lateral enclosure of path 6 as shown in FIGS. 2 and 3. The heat exchange plates 18 each have inner and outer walls 22 and 24, respectively, joined at the edges to define a chamber 26 for the passage of a heated fluid through appropriate inlets and outlets (not shown).

The path 6 is shallow in the cross-sectional direction running from one inner wall 22 to the other inner wall 22 (in the direction of inclination of the path) with the distance between these walls being such that the polymer is uniformly heated across the path by heat transfer from the walls 22. Generally, the dimension in the shallow direction of the cross-section (height) is from about ⅝ in. to about 2 in. The dimension of the cross-section which is transverse to the cross-sectional height, i.e., the cross-sectional width, will for economical purposes be much greater than the height, e.g., at least three times as great. Higher ratios such as at least 10:1, width to height, can also be used, with the limitation in this respect being dependent on the dimensional stability of the lateral enclosure defining the path. The length of the path 6 is such as to give sufficient exposure to heating by heat exchange plates 18 to attain the moisture content desired in the dried polymer.

Particulate polymer 28 fills the entire apparatus 2 which results in the cross-section of the path 6 being filled with polymer as shown in FIG. 3. Because of this filled condition and the absence of any turbulence, the gravity advancement of the polymer 28 along path 6 is believed to occur by plug-flow, such that the volume of polymer bounded by dashed lines *a* in FIG. 2 will remain substantially integral throughout the length of the path. The rate of advancement of the polymer is controlled by the rate of withdrawal of dried polymer from receiver 12 by means (not shown) which does not permit entry of air. Sufficient moist polymer 28 is added through hopper 10 to maintain the apparatus 2 full of polymer, at least up to and including the bottom opening in hopper 10.

The heat transfer of the heat exchange plates 18 to the polymer in path 6 is generally sufficient to uniformly heat the polymer to within at least 60° C. of its melting point, yet short of the temperature at which the polymer particles fuse to one another. For such materials as polyhexamethylene adipamide (66 nylon) and polyethylene terephthalate, the drying temperature will be at least 190° C. Use of these high temperatures provides quick drying and high dryer capacity. The heat exchange plates 18 and end bars 20 are jacketed in insulation 30 to prevent heat loss.

During the heating of the polymer in path 6, the polymer is maintained under an inert atmosphere obtained by an inert gas supplied through inlet 16 to prevent oxidative degradation of the polymer. Enough inert gas is supplied to satisfy the natural draft caused by the heating along path 6 to thereby prevent air from being sucked into the lower portion of the apparatus 2, even though the apparatus is made air-tight, except for hopper 10.

A further measure for air exclusion includes maintaining the apparatus 2 full of polymer. In addition, whatever means are used for supplying polymer to the path is constructed so as to minimize entrance of air into the apparatus. In most cases, a hopper, such as hopper 10, which tapers inwardly to form a constricted bottom opening which is just large enough to handle the feed rate without choking will serve this purpose. These further measures minimize the space available for air within the apparatus and minimize the diffusion of air into the apparatus through hopper 10. The small amount of air that might so enter is sparged or swept away by the upwardly flowing inert gas.

The amount of inert gas used to prevent air from being sucked into the apparatus is generally also sufficient to both carry off vaporized moisture from the polymer and to sparge air from entering through hopper 10 polymer. Usually, no greater than 3 cubic feet of inert gas (s.t.p.) per pound of polymer dried is required. In many cases, no more than about 1 cubic foot of gas per pound of polymer dried will be required. At these levels of use of the inert gas, it need not be dehumidified and recycled for economical operation. In any case, the amount of inert gas used will be far less than if the inert gas were used as the drying gas (source of heat).

Figure 4:
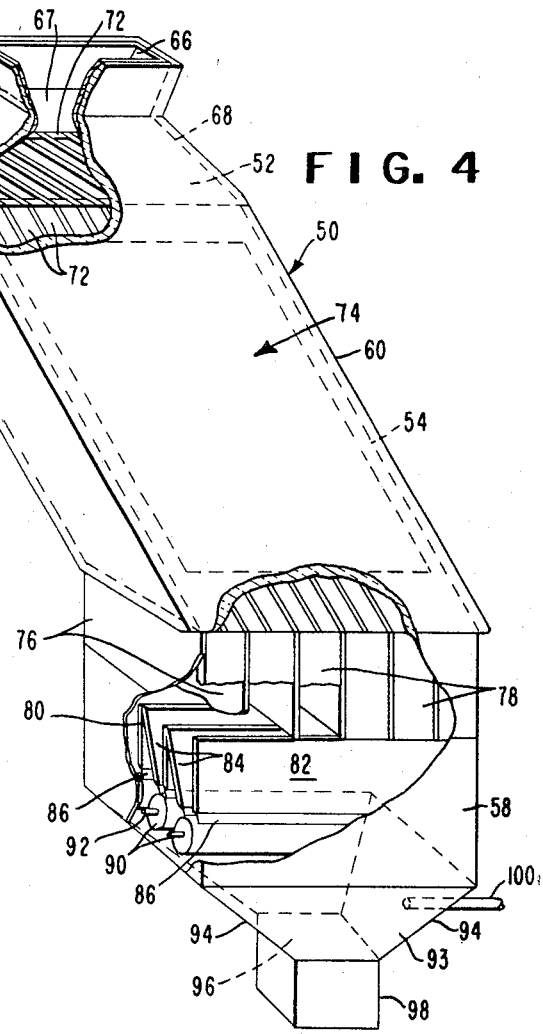
FIG. 4 is a perspective, partially cut-away view 30 of another embodiment of apparatus of the present invention.

In FIG. 4 is shown another embodiment 50 of a dryer of the present invention, constructed in accordance with the principles hereinbefore set forth with respect to the apparatus to FIGS. 1–3. Dryer 50 comprises an inlet section 52, a heating section 54 which is inclined from the horizontal at an angle of 60°, and a feeding section 58, named in the order of flow of particulate polymer through the dryer 50. The inlet section 52 and heating section 54 are covered with insulating material 60 and are therefore shown in dashed lines.

The inlet section 52 consists of an open-topped hopper 66 which terminates in a bottom opening 67 and in diverging side walls 68 which, in turn, terminate in register with the inclined heating section 54.

The heating section 54 is composed of a plurality of correspondingly inclined plates 70, which are serially spaced from one another in substantially parallel relationship by end spacers 72 positioned between adjacent plates 70. The plates 70 and spacers 72 run the full length of the heating section 54 and terminate in common upper lower horizontal planes to form a plurality of laterally enclosed paths 71, which are shallow in the directions from plate to plate, for polymer running the full length of the heating section 54.

The side edges of the plates 70 are heated along the area 74 which is outlined in dashed lines along a pair of opposite sides of the heating section 54 (only one side shown). This heating raises the eemperature of each of the plates 70 and spacers 72, which in turn heat the polymer by heat transfer across the paths.

Depending from the outlet end of the heating section 54 are a series of plates 76 running contiguous with the lower edge of every other plate 70. The plates 76 are spaced in substantially parallel relationship from one another by end spacers 78 positioned at each end (only one end shown) and running the full height of the plates 76. These plates provide contact surfaces to the polymer for the purpose of cooling, the plates 76 being in heat exchange relationship with a cooler (not shown). The plates 70 and 76 are preferably made of material which is inert to the polymer and which has good thermal conductivity. Aluminum and stainless steel are examples of suitable metals. These can also be used for spacers 72 and 78.

Extending transversely to the plates 70 and 76 are a series of inverted V-shaped walls 80 and a pair of end walls 82 (only one of which is shown) which cooperate to form a series of troughs 84 in the feeding section 58. Positioned along the lower edge of the end walls 82 and each lower edge of tthe V-shaped walls 80 are strips 86 of flexible materials such as spring steel. Substantially in contact with these strips and forming a bottom closure for the troughs 84 are a series of rolls 90 revolvably mounted via shafts 92. The stream of polymer coming from each narrow path 71 of the heating section 54 is divided or cut into a plurality of streams, with the corresponding cuts from each path being collected in the troughs 84. Thus, the collected polymer in each trough represents a sampling of dried polymer from each path of the heating section.

The so-collected polymer is simultaneously discharged or fed from the troughs 84 by simultaneous rotation of each of the rolls 90, which causes the powder to flow between the roll surface and the strips 86 and into a hopper 93. The surface of rolls 90 can be smooth or roughened, depending on the particle sizes in the dried polymer. The converging walls 94 of the hopper combine the flow of polymer from all the troughs, thus further increasing the uniformity of the polymer. The walls 94 terminate in an opening 96 which communicates with a device 98 which permits discharge of the polymer without permitting the entry of air. By way of example, device 98 can be the feed hopper of an extruder or a conventional air-lock.

The dryer 50 is maintained essentially air-tight except for the opening in the hopper 66 through which moist particulate polymer is fed into the dryer. Inert gas added through inlet 100 is carried upward through the shallow paths by the draft which is induced by the heated plates 70. The constriction between hopper 66 and diverging side walls 68 serves to minimize the area of access for air, which is for practical purposes, excluded by the rising inert gas.

Additional features and variations in the features from the apparatus shown in FIG. 4 are shown in FIGS. 5 to 8. Where elements are the same as in FIG. 4 they are numbered the same. In FIG. 5 is shown the hopper 66 and diverging side walls 68 of the inlet section bolted together through external flanges 110 mounted to respective elements. A bridging section 112 is provided intermediate the inlet section 52 and the heating section 54. The inlet section 52, the bridging section 112, the heating section 54 and feeding section 58 are serially bolted to one another via external flanges 110, which are welded to their respective sections.

Figure 6:
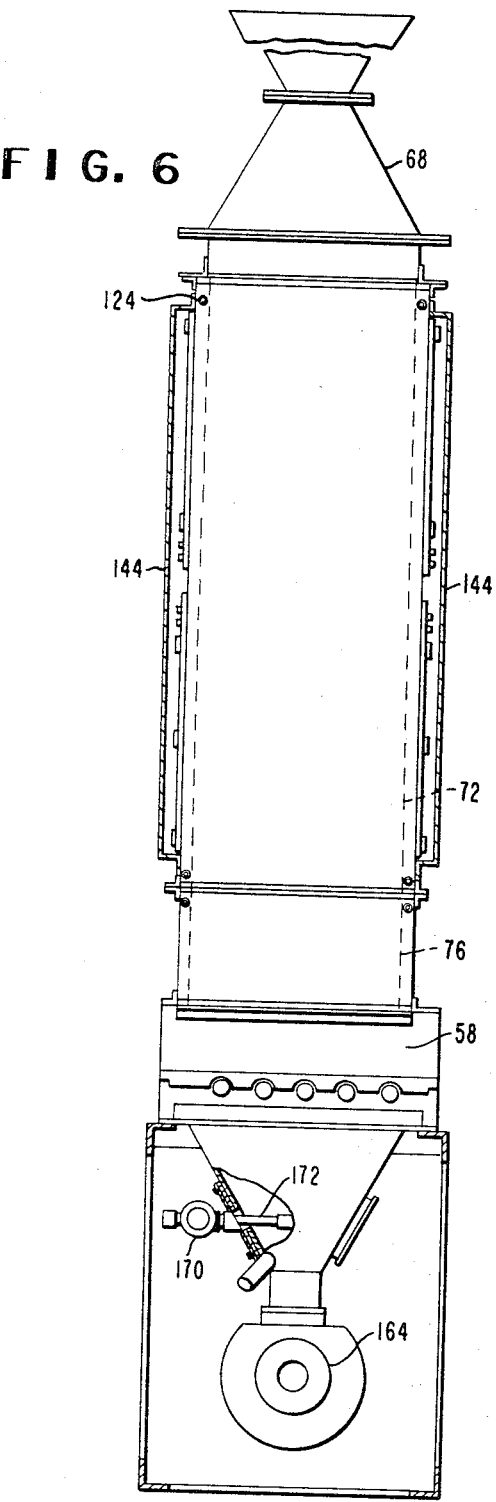
FIG. 6 is a side elevation of a side which is at right angles to the view shown in FIG. 5.
Figure 8:
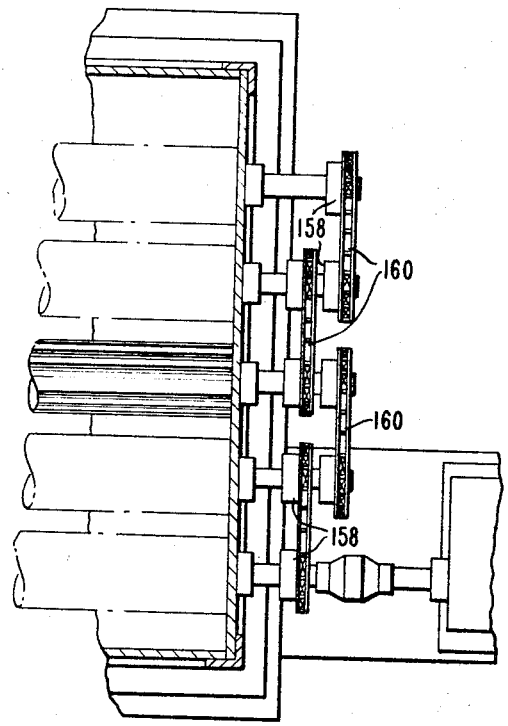
FIG. 8 is a section taken along line 8—8 of FIG. 5.

Plates 70 and spacers 72 are secured to one another by vertically-spaced tie rods 124 which extend through registering apertures in the plates and spacers. The assemblage of plates and spacers is clamped together by nuts 126 threaded onto the tie rods 124 and abutting angled adapters 128 against the outermost plates as shown in FIGS. 5 and 6.

The plates 76 and spacers 78 of the feeding section 58 are assembled in a similar manner, by tie rods 130 and nuts 132. In this case, however, the tie rods are hollow for the passage of cooling water to cool the spacers and plates, which thereby cool the particulate polymer. Tubing 131 connects tie rods 130 in series to form a continuous passage for the cooling water. The tubing is provided with suitable water inlet and outlet (not shown).

Heating in the heating section 54 is obtained by a pair of groups of electrical strip heaters 134 positioned along the longitudinal edges of the plates 70 and along the length of the spacers 72. These strip heaters are maintained pressed against the plates and spacers by vertically-spaced hold-down strips 136, which are secured by bolts 138 threaded into various of the spacers 72. A pair of bus bars 140 are provided in electrical contact with each of the strip heaters 134. These bus bars extend beyond one side of the heating section as shown for connection with an external power source (not shown). The protruding ends of the bus bars are shielded by a cover 142 and the strip heaters are enclosed to form an airtight jacket by covers 144.

The feeding section 58 is similar to the corresponding section shown in FIG. 4, except that rolls 150, corresponding to rolls 90, are five in number and have spaced longitudinal channels 152 along their circumference for feeding coarse polymer from the troughs upon rotation of the rolls. The end walls 82 are secured to exterior walls 154 to make this section of the apparatus air tight. The flexible strips 86 are welded to the end wall 82 provided with such a strip, and to the inverted V-shaped walls 80. The longitudinally channeled rolls 150 are driven in unison by a variable speed power source 156 coupled to one of the rolls 150, with the rotation of this roll being transmitted down the line of rolls by sprockets 158 and drive chains 160 trained around the sprockets. The feeding section 58 is provided with a central discharge opening 162 which communicates directly with the barrel 164 of an extruder. A bypass outlet 166 from the feeding section 58 is provided for removing polymer from the dryer without going through the extruder. This bypass outlet is closed by removable cap 168 when the polymer is to be directly discharged into the extruder. The feeding section 58 is also provided with an inert gas inlet 180 and an automatic level control 170, which by its probe 172 extending within the section 58 senses the level of polymer therein, and controls the speed of the variable power source 156 to continue feeding polymer into this section until the probe 172 is covered.

In operation, the dryer 50 is filled with particulate polymer, and thereafter gradually heated up in heating section 54 to the temperature desired. During this heating, the gradually heated polymer is continuously removed through the bypass outlet 166 and returned to hopper 66. This recycling enables the heating section 54 to reach the temperature desired without causing plugging of the paths 71 by the expanding, heated polymer. During this heat-up and subsequent heating, inert gas such as $N_2$ or $CO_2$ is fed into the dryer to flow upwardly through the path and out the inlet of hopper 66 to exclude air from entering. Super-heated steam can be used as the inert gas once heat-up has been completed.

During operation of the dryer, the polymer is fed into the hopper 66 to maintain the level of powder above the constriction between the hopper and diverging side walls 68 whether or not the polymer is being withdrawn from the troughs 84 by rotation of the rolls. During withdrawal, the polymer advances along the paths 71 by gravity flow to become heated by heat transfer from plates 70, and the polymer is maintained under an inert atmosphere. A dryer constructed in accordance with dryer 50, with the spacers being one inch square bars and plates 70 having a heating surface of 140 ft.$^2$ can dry 66 nylon molding powder containing about 6 per cent by weight of water at 195° C. at the rate of about 200 pound per hour (a residence time of about 1½ hour) to powder having a moisture content of about 0.15 percent by weight. Moisture content, as referred to herein, is the weight lost as determined on a small weighed sample (2–3 g.) of particulate polymer, which after weighing is heated in a hot air oven at 280° C. for 10 minutes, cooled in a desiccator, and reweighed. A hopper bottom opening of from 4 to 16 in.$^2$ is sufficient to maintain this dryer full and yet minimize the area for entry of air.

The particulate polymer which can be processed in the apparatus and by the process of the present invention include any of those powders which are free-flowing by gravity, and which withstand heat under inert atmosphere conditions. Molding powders, i.e., polymer which is chopped up into bead, cube or other substantially symmetrical form, are particularly suited for treatment according to the present invention. Examples of suitable particulate polymer, especially molding powder, include polyamides such as 6, 610, and 66 nylons, polyethylene terephthalates, and acrylic polymers, such as polymethylmethacrylate.

An example of apparatus of the present invention consists of the assemblage of three aluminum plates measuring ⅛ in. x 8 in. x 48 in., with edge spacers of aluminum rods measuring ¾ in. x ¾ in. x 48 in., which form two laterally enclosed paths, each 48 in. in length and inclined at angles of 60° from the horizontal and having a rectangular cross-section of ¾ in. x 6½ in. x 48 in. in length. Two electric heaters of 500 watts each are bolted to the edge spacers along each side of the paths, and are controlled by a thermocouple extending into one of the spacers to maintain a temperature of 200° C. The outlet end of the paths are connected to a screw dumper, while a feed funnel is connected to the inlet end of the narrow paths and the entire apparatus is surrounded by thermal insulation. A small nitrogen stream is fed into the outlet end of each of the paths. With these operating conditions and apparatus it is possible to dry 66 nylon molding powder continuously from a moisture content of 1.85 percent by weight to 0.12 percent by weight at the rate of 11 pounds per hour.

High quality moldings are obtained from particulate polymer treated according to the present invention. Dried moisture contents of 0.15% by weight and below are readily obtainable. The moldings are bubble-free and tough, and in this respect, give better results than particulate polymer dried by other methods using lower temperatures. As the residence time of the polymer in the apparatus of this invention increases (under inert atmosphere) the relative viscosity of articles molded therefrom increases to indicate that solid phase polymerization of the polymer has occurred during moisture removal.

As many apparently widely different embodiments of this invention may be made without departing from the spirit and scope thereof, it is to be understood that this invention is not limited to the specific embodiments thereof except as defined in the appended claims.

What is claimed is:

1. Apparatus for drying polymer in free-flowing particulate form, comprising structure defining at least one laterally enclosed path having a cross-section which is shallow in one direction, an inlet end for receiving said polymer, and means through which said path is maintained filled with said polymer, and an outlet end, said path being inclined at an angle from the horizontal at which said polymer moves along said path by gravity flow to said outlet ends, means for heating the lateral enclosure which defines the shallow cross-section of said path so as to heat said polymer in said path by heat transfer from said lateral enclosure, and means for supplying inert gas to the outlet of said path to maintain the polymer therein under an inert atmosphere during heating.

2. The apparatus of claim 1 wherein said structure defines a plurality of said paths and includes plate members that are common to adjacent said paths to form said lateral enclosure which defines said shallow cross-section.

3. The apparatus of claim 2 wherein said structure includes a polymer supply inlet which is common to each said paths for supplying the polymer to the inlet end thereof.

4. The apparatus of claim 1 wherein said structure includes a plurality of plate members and end bar means spaced from one another for spacing said plate members from one another to form the lateral enclosure of each said path.

5. The apparatus of claim 4 wherein said plate members of aluminum and said heating mens heats the longitudinal edges of said plate members.

6. The apparatus of claim 1 wherein the angle of inclination of said path is at least about 60° from the horizontal.

7. The apparatus of claim 1 and additionally, means for withdrawing polymer from said outlet end of said path at a controlled rate.

8. The apparatus of claim 7 and additionally, means for cooling said polymer between said outlet end and said withdrawing means.

9. The apparatus of claim 1 wherein said structure defines a plurality of said paths and additionally present are means for dividing the flow of polymer from the outlet end of each said path into a plurality of separate streams, means for collecting said streams into groups which are representative of the polymer from said paths, and means for simultaneously feeding and recombining polymer from each said groups.

10. A process for drying polymer in particulate free-flowing form, comprising advancing by gravity flow said polymer along a laterally enclosed path having a cross-section which is shallow in one direction, maintaining said path filled with said polymer, heating the lateral enclosure which forms the shallow cross-section of said path so as to heat the polymer therein by heat transfer, maintaining the polymer under an inert atmosphere during said heating, and obtaining as the result thereof dry polymer.

11. The process of claim 10 wherein said heating heats said polymer to within 60° C. of its melting point.

12. The process of claim 10 wherein said heating heats said polymer to at least 190° C.

13. The process of claim 10 including supplying said polymer to said path from a constricted opening, and maintaining the level of polymer in said path at least up to said constricted opening.

14. The process of claim 10 wherein said polymer is polyamide.

References Cited
UNITED STATES PATENTS

| | | | |
|---|---|---|---|
| 466,045 | 12/1891 | Jones | 263—30 X |
| 785,067 | 3/1905 | Heath et al. | 263—30 X |
| 1,360,336 | 11/1920 | Warrenfeltz | 263—30 X |
| 1,692,587 | 11/1928 | Smith | 263—30 X |
| 2,081,240 | 5/1937 | Knapp et al. | 34—165 X |
| 3,350,995 | 11/1967 | Jeru | 34—167 |

JOHN J. CAMBY, *Acting Primary Examiner.*